United States Patent
Huang et al.

(10) Patent No.: US 9,976,326 B2
(45) Date of Patent: May 22, 2018

(54) HINGE DEVICE AND ELECTRONIC DEVICE HAVING THE SAME

(71) Applicant: GETAC TECHNOLOGY CORPORATION, Hsinchu County (TW)

(72) Inventors: Tzu-Chiu Huang, Taipei (TW); Juei-Chi Chang, Taipei (TW); Kun-Cheng Lee, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 95 days.

(21) Appl. No.: 15/192,660

(22) Filed: Jun. 24, 2016

(65) Prior Publication Data

US 2017/0370136 A1 Dec. 28, 2017

(51) Int. Cl.
*E05D 5/02* (2006.01)
*E05D 5/06* (2006.01)
*G06F 1/16* (2006.01)

(52) U.S. Cl.
CPC ............... *E05D 5/06* (2013.01); *E05D 5/02* (2013.01); *G06F 1/1616* (2013.01); *G06F 1/1681* (2013.01); *E05Y 2900/606* (2013.01)

(58) Field of Classification Search
CPC ........ E05D 5/02; E05D 5/06; E05Y 2900/606
USPC .................................................. 16/382, 387
See application file for complete search history.

(56) References Cited

U.S. PATENT DOCUMENTS

| | | | | |
|---|---|---|---|---|
| 7,222,396 B2* | 5/2007 | Lu | ......... | E05D 11/087 16/330 |
| 7,520,027 B2* | 4/2009 | Lu | ......... | G06F 1/1616 16/337 |
| 7,543,358 B2* | 6/2009 | Lin | ......... | E05D 11/087 16/319 |
| 7,578,032 B2* | 8/2009 | Chen | ......... | E05D 11/06 16/342 |
| 8,918,961 B2* | 12/2014 | Yu | ......... | G06F 1/1681 16/382 |
| 2005/0039301 A1* | 2/2005 | Lu | ......... | G06F 1/1616 16/321 |
| 2005/0115025 A1* | 6/2005 | Minaguchi | ........ | G06F 1/1616 16/259 |
| 2007/0199179 A1* | 8/2007 | Wang | ......... | G06F 1/1616 16/340 |
| 2008/0120808 A1* | 5/2008 | Wang | ......... | G06F 1/1616 16/332 |
| 2009/0083943 A1* | 4/2009 | Chen | ......... | G06F 1/1616 16/342 |

(Continued)

*Primary Examiner* — Roberta S Delisle

(57) ABSTRACT

A hinge device and an electronic device having the same are provided. The hinge device includes a hinge element, first connecting element, and second connecting element. The first connecting element includes first, second and third segments. The second segment is disposed between the first and third segments. The third segment is connected to the hinge element. The first segment includes a first connecting plate and first folding plate between which a first angle less than 180 degrees but greater than 0 degree is defined. The first folding plate has one side connected to the first connecting plate. The second connecting element includes a first fixing plate, first boss, and first extending arm. The first extending arm has one end connected to the hinge element and the other end connected to the first fixing plate. The first boss is connected to the first fixing plate.

20 Claims, 6 Drawing Sheets

(56) References Cited

U.S. PATENT DOCUMENTS

2009/0089975 A1* 4/2009 Chern, Jr. ............. G06F 1/1616
16/321

* cited by examiner

HINGE DEVICE AND ELECTRONIC DEVICE HAVING THE SAME

BACKGROUND OF THE INVENTION

Field of the Invention

The present invention relates to hinges and, more particularly, to a hinge device and an electronic device having the same.

Description of the Prior Art

Among conventional electronic devices, some, especially portable ones, come with a hinge device, a first body, and a second body, with the first and second bodies pivotally connected to each other, and the first body pivotally connected to the second body through the hinge device. Take a notebook computer as an example, the first body comprises a display module, whereas the second body comprises a keyboard, computer parts and components, and a battery. The hinge device has a hinge and two supports. At least one of the supports is pivotally connected to the hinge. The two supports are connected to the first body and the second body, respectively. The two supports and the hinge together enable the first body and the second body to rotate relative to each other about the hinge. The first body and the second body rotate pivotally relative to each other to enter a shut state or rotate pivotally relative to each other to open to a specific angle. For instance, the first body rotates relative to the second body to open to a specific angle while the second body is resting on a carrying plane, so as for the keyboard to be parallel to the carrying plane to facilitate user operation and for the screen of the display module to face users and be watched by the users.

Portable electronic devices are used in a wide variety of scenarios. Although portable electronic devices mostly operate in general situations, they may operate in harsh usage environments and conditions. For example, servicemen and servicewomen are likely to turn on and turn off portable electronic devices forcibly, quickly and frequently, that is, make numerous instances of pivotal rotation of the bodies relative to each other and subject the two bodies and the hinge device to a large torque.

SUMMARY OF THE INVENTION

The service life of electronic devices and hinge devices depends on their usage. However, conventional electronic devices and hinge devices do not have sufficient mechanical strength for them to operate in harsh usage environments and conditions. As a result, conventional electronic devices and hinge devices often get damaged because of frequent use or when operating under an overly large torque. Furthermore, electronic devices (such as notebook computers) with a large-sized screen have a taller body than electronic devices with a small-sized screen, as the body of the former has a longer side perpendicular to the axial direction of the hinge devices. Since electronic devices with a large-sized screen have a longer moment arm, users moving the bodies of the electronic devices with a large-sized screen exert a larger moment of force on the hinge devices and subject a larger bending moment to the bodies. Therefore, the hinge devices and the bodies of the electronic devices with a large-sized screen are subjected to a larger stress and thus likely to deform or bend. In addition, in case a conventional electronic device falls off or is hit, the junction of the hinge device and the body of the electronic device will tend to sever or break. Moreover, in the event of an overly large difference between the thickness of the body of the electronic device and the thickness of supports of the hinge device, the junction of the body and the supports will be likely to get damaged, because the supports merely rely upon their relatively thin structure to bear a relatively large moment of force.

In view of the aforesaid drawbacks of the prior art, it is an objective of the present invention to provide a hinge device and an electronic device having the same to overcome the drawbacks as follows: an electronic device and a hinge device have insufficient mechanical strength and thus are likely to get damaged, deform or bend; and, if the electronic device falls off or is hit, the junction of the hinge device and the body of the electronic device will tend to sever or break.

In an embodiment of the present invention, a hinge device comprises a hinge element, first connecting element, and second connecting element. The first connecting element comprises a first segment, second segment, and third segment. The second segment is disposed between the first segment and the third segment. The first segment, second segment, and third segment together form the first connecting element. The third segment is connected to the hinge element. The first segment comprises a first connecting plate and a first folding plate. The first folding plate has one side connected to the first connecting plate. A first angle is formed between the first connecting plate and the first folding plate. The first angle is less than 180 degrees but greater than 0 degree. The second connecting element comprises a first fixing plate, a first boss, and a first extending arm. The first extending arm has one end connected to the hinge element and the other end connected to the first fixing plate. The first boss is connected to the first fixing plate.

In an embodiment of the present invention, the second segment comprises a second connecting plate and a second folding plate. The second connecting plate has one end connected to the first connecting plate and the other end connected to the third segment. The second folding plate has one side connected to the second connecting plate. A second angle is formed between the second connecting plate and the second folding plate. The second angle is less than 180 degrees but greater than 0 degree.

In an embodiment of the present invention, both of the first angle and the second angle are equal to 90 degrees.

In an embodiment of the present invention, a third angle, less than 180 degrees but greater than 90 degrees, is formed between the first folding plate and the second folding plate.

In an embodiment of the present invention, the first folding plate is connected to the second folding plate, and a recess is formed at the junction of the first folding plate and the second folding plate.

In an embodiment of the present invention, the second connecting element further comprises a second fixing plate, a second boss, and a second extending arm. The second extending arm has one end connected to the hinge element and the other end connected to the second fixing plate. The second boss is connected to the second fixing plate.

In an embodiment of the present invention, the first extending arm and the first boss are vertically disposed on different edges of the first fixing plate, respectively, whereas the second extending arm and the second boss are vertically disposed on different edges of the second fixing plate, respectively.

In an embodiment of the present invention, the first extending arm is connected and fixed to the second extending arm. Alternatively, the first extending arm and the second extending arm are integrally formed.

In an embodiment of the present invention, the hinge element comprises a shaft and an extending board. The extending board is connected to one end of the shaft and extended axially along the shaft. The third segment and the extending board are fixed to each other. The first extending arm is pivotally connected to the shaft.

In an embodiment of the present invention, the second connecting element further comprises a third fixing plate perpendicularly connected to the first fixing plate.

In an embodiment of the present invention, an electronic device comprises a hinge device, a plurality of connecting units, a first body, and a second body. In the hinge device, the first connecting plate comprises a plurality of first connecting holes. The first fixing plate comprises a first fixing hole. The first boss comprises a first fastening hole. The first fastening hole is concavely disposed at one end of the first boss and positioned distal to the first fixing plate. The first body comprises a first board and a second board. One of the connecting units penetrates the first connecting holes and is connected to the first board. One of the connecting units penetrates the first connecting holes and is connected to the second board. The second body comprises a third board and a fourth board. One of the connecting units penetrates the first fixing hole and is connected to the third board. One of the connecting units penetrates the first fastening hole and is connected to the fourth board.

In an embodiment of the present invention, the first board and the second board are connected to each other. The first connecting element is disposed between the first board and the second board. The third board has one side connected to the fourth board and the other side connected to the first fixing plate. The first boss penetrates the third board and is disposed between the third board and the fourth board.

In an embodiment of the present invention, a first edge and a second edge of the first body are perpendicular to each other. The first edge is parallel to the first segment. The second edge is parallel to the shaft. The length of the first segment equals one-third to one-fourth of the length of the first edge.

In conclusion, in an embodiment of the present invention, mechanical strength of the hinge device and the electronic device is enhanced, whereas connections among the hinge device, the first body and the second body are stronger. Hence, the electronic device having the hinge device has sufficient mechanical strength to operate in harsh usage environments and conditions without getting damaged. Even though the electronic device comes with a large-sized screen, both the hinge device and the body are strong enough to bear a large stress without deforming or bending. In addition, if the electronic device falls off or is hit, connections among the hinge device, the first body and the second body will not sever or break. Moreover, due to the bosses of the fixing plates, the hinge device can bear a larger moment of force so that the junction of the second body and the hinge device is firmer.

Fine structures and advantages of the present invention are described below with reference to preferred embodiments of the present invention to enable persons skilled in the art to gain insight into the technical features of the present invention and implement the present invention accordingly. Persons skilled in the art can easily understand the objectives and advantages of the present invention by making reference to the disclosure contained in the specification, the claims, and the drawings.

DETAILED DESCRIPTION OF THE EMBODIMENTS

Figure 1:
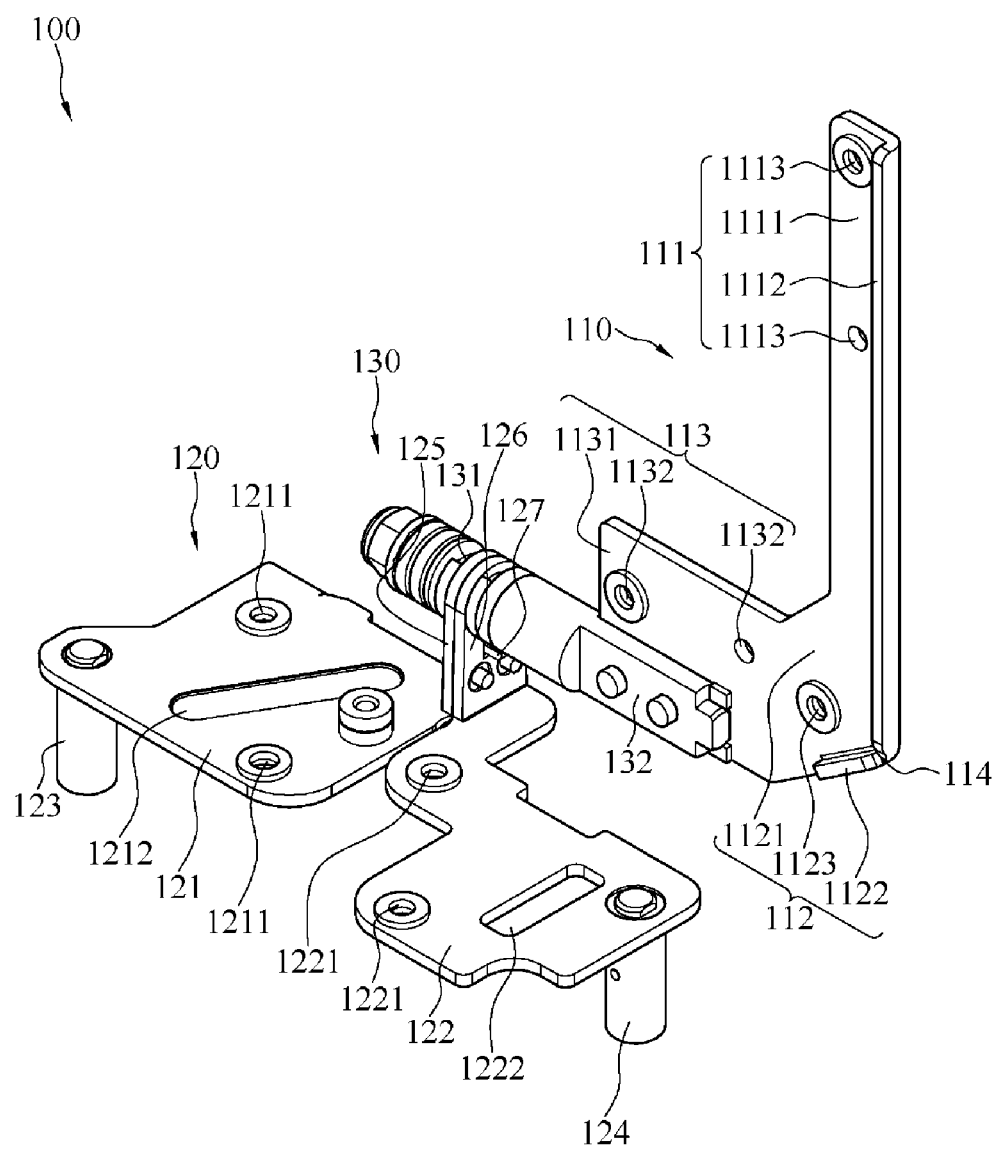
FIG. 1 is a schematic view of a hinge device taken from an angle according to an embodiment of the present invention.
Figure 2:
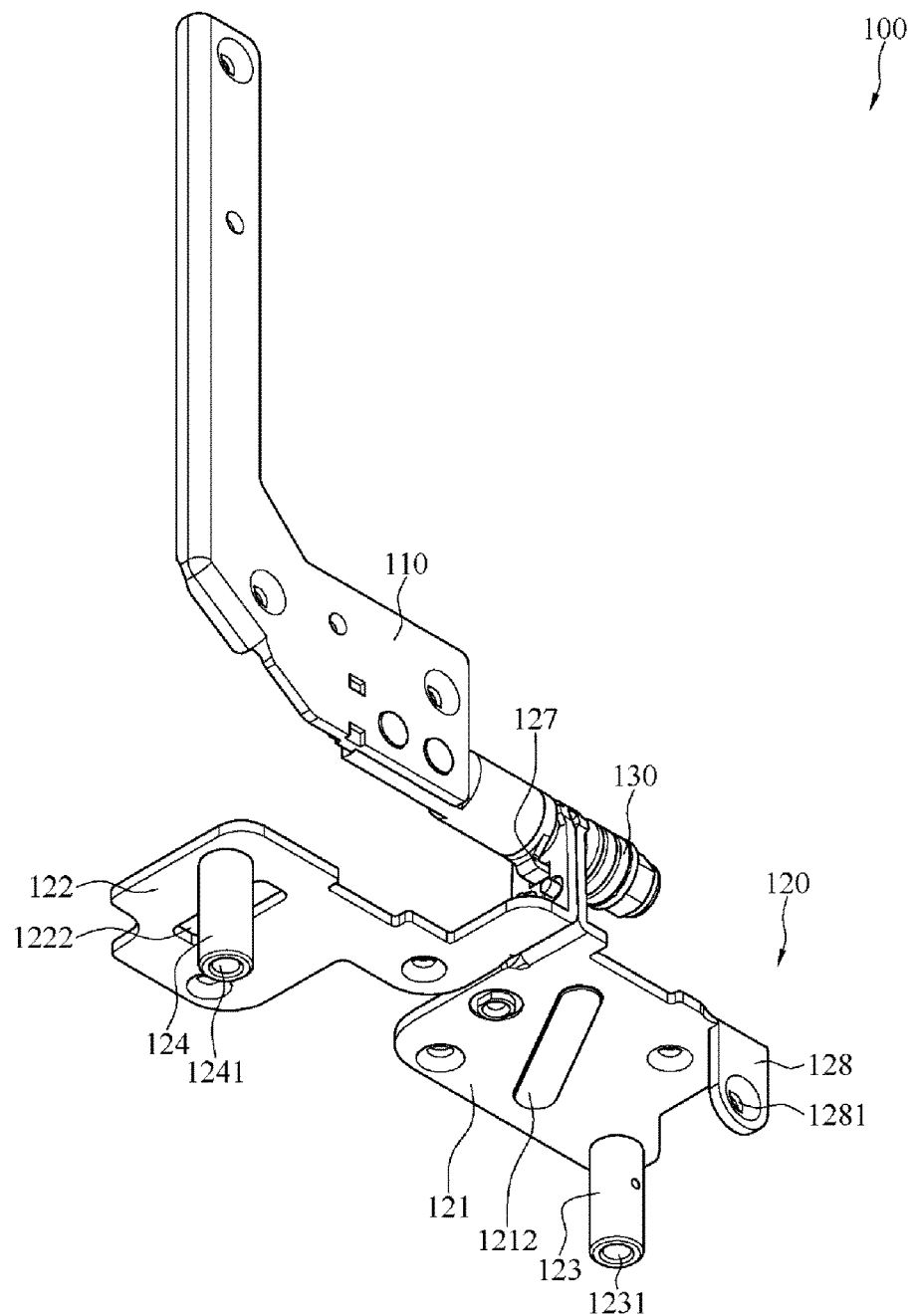
FIG. 2 is a schematic view of the hinge device taken from another angle.

Referring to FIG. 1 and FIG. 2, there are shown two schematic views of a hinge device 100 taken from an angle and another angle according to an embodiment of the present invention, respectively. In this embodiment, the hinge device 100 is pivotally connected between a first body 210 and a second body 220 (see FIG. 6 for the first body 210 and the second body 220) of a portable electronic device (such as a notebook computer, but the present invention is not limited thereto.) The hinge device 100 comprises a first connecting element 110, a second connecting element 120, and a hinge element 130. The first connecting element 110 and the hinge element 130 are fixed to each other. The first connecting element 110 comprises a first segment 111, a second segment 112, and a third segment 113. The second segment 112 is disposed between the first segment 111 and the third segment 113. Opposing sides of the second segment 112 are connected to the first segment 111 and the third segment 113, respectively. The third segment 113 is connected to the hinge element 130.

Figure 3:
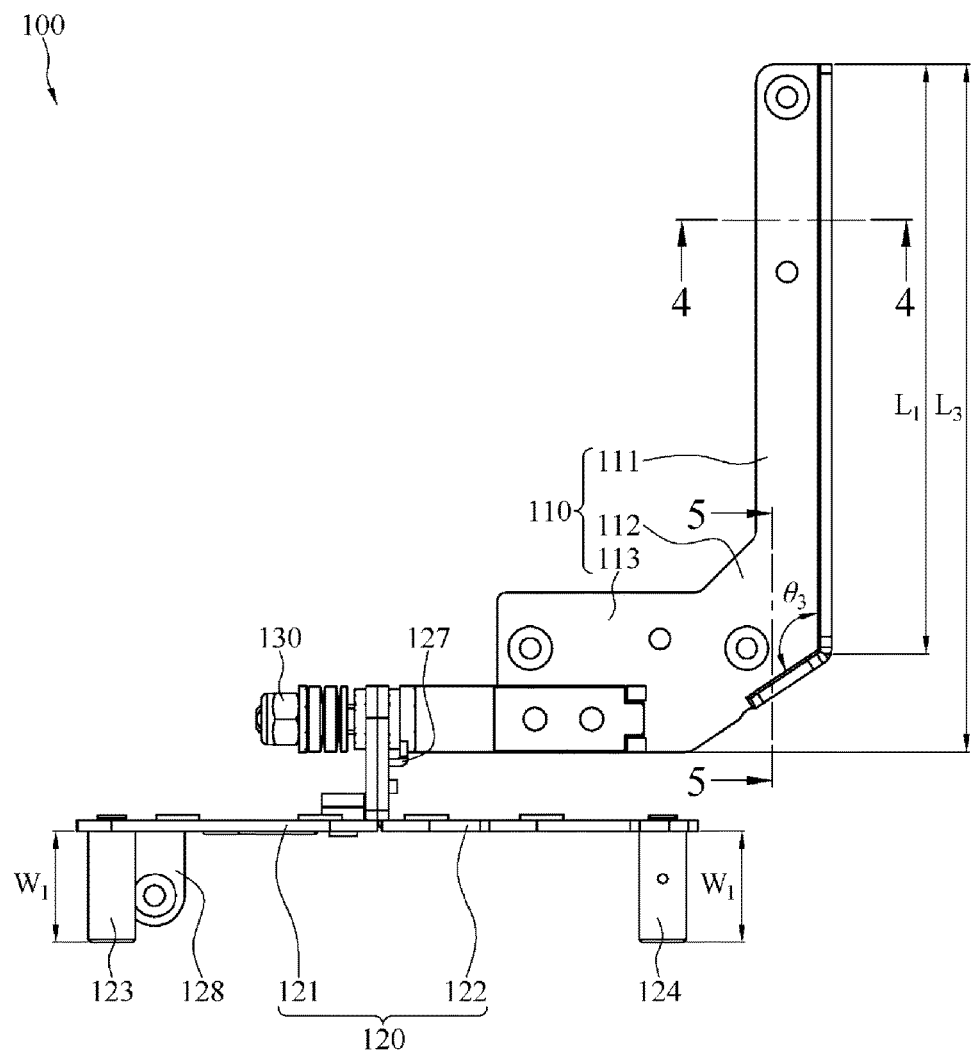
FIG. 3 is a front view of the hinge device.

Referring to FIG. 3, there is shown a front view of the hinge device 100 of FIG. 1. The first segment 111, second segment 112, and third segment 113 are collectively L-shaped substantially. The first segment 111 and the third segment 113 are perpendicular to each other. The second segment 112 is disposed at the bend between the first segment 111 and the third segment 113 to serve as a transitional structure between the first segment 111 and the third segment 113. Specifically speaking, the second segment 112 is oblique relative to both the first segment 111 and the third segment 113, that is, not perpendicular thereto; hence, the included angle at the bend between the first segment 111 and the second segment 112 is greater than 90 degrees, whereas the included angle at the bend between the third segment 113 and the second segment 112 is also greater than 90 degrees. Assuming that the second segment 112 were missing and the first segment 111 were perpendicularly connected to the third segment 113, the included angle at the bend between the first segment 111 and the third segment 113 would be 90 degrees. In this situation, if a stress is exerted upon the first segment 111, the stress will be transferred to the hinge element 130 through the first segment 111 and the third segment 113, and thus stress concentration will happen to the bend between the first segment 111 and the third segment 113, thereby causing the bend to undergo material fatigue or rupture because of the stress concentration. This embodiment is characterized in that a stress exerted upon the first segment 111 is transferred to the hinge element 130 through the first segment 111, the second segment 112, and the third segment 113 so that the second segment 112 distributes the stress and thus prevents or reduces stress concentration at the bend, thereby enhancing overall mechanical strength.

In this embodiment, referring to FIG. 1 through FIG. 3, the first segment 111 comprises a first connecting plate 1111 and a first folding plate 1112. The first folding plate 1112 has one side connected to the first connecting plate 1111. The second segment 112 comprises a second connecting plate 1121 and a second folding plate 1122. The second folding plate 1122 has one side connected to the second connecting plate 1121. The third segment 113 comprises a third connecting plate 1131. The second connecting plate 1121 has one end connected to the first connecting plate 1111 and the other end connected to the third connecting plate 1131. In a variant embodiment, although the first connecting element 110 comprises the first segment 111, second segment 112, and third segment 113, only the first segment 111 has a folding plate. Alternatively, the first segment 111, second segment 112, and third segment 113 of the first connecting element 110 each have a folding plate. In this embodiment, the first folding plate 1112 is connected to the second folding plate 1122. In a variant embodiment, the first folding plate 1112 is not connected to the second folding plate 1122 so that the first folding plate 1112 and the second folding plate 1122 are separated.

Figure 4:
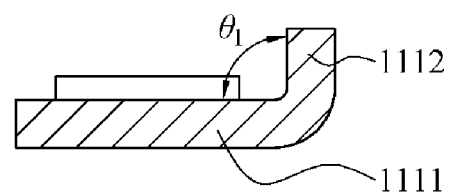
FIG. 4 is a cross-sectional view of the hinge device taken along line 4-4 of FIG. 3.
Figure 5:
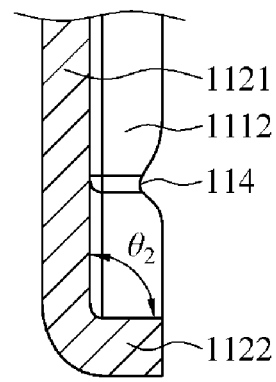
FIG. 5 is a cross-sectional view of the hinge device taken along line 5-5 of FIG. 3.

Referring to FIG. 4 and FIG. 5, there are shown two cross-sectional views of the hinge device 100 taken along line 4-4 and line 5-5 of FIG. 3, respectively. In this embodiment, referring to FIG. 4, a first angle $\theta_1$ is formed between the first connecting plate 1111 and the first folding plate 1112 and equals 90 degrees. In a variant embodiment, the first angle $\theta_1$ is less than 180 degrees but greater than 0 degree. In this embodiment, referring to FIG. 5, a second angle $\theta_2$ is formed between the second connecting plate 1121 and the second folding plate 1122 and equals 90 degrees. In a variant embodiment, the second angle $\theta_2$ is less than 180 degrees but greater than 0 degree. The first folding plate 1112 and the second folding plate 1122 increase the mechanical strength of the first segment 111 and the second segment 112. Therefore, the maximum bending moment bearable by the first connecting element 110 with the first folding plate 1112 and second folding plate 1122 is greater than the maximum bending moment bearable by the first connecting element 110 without the first folding plate 1112 and second folding plate 1122. In order for the maximum bending moment to be bearable, the first connecting element 110 neither bends nor undergoes plastic deformation.

In this embodiment, the first segment 111 is a flat board before it undergoes a processing process, and the processing process entails bending the first segment 111 to form two boards, i.e., the first connecting plate 1111 and the first folding plate 1112, which together define an included angle therebetween. In this embodiment, the second segment 112 undergoes the same processing process as the first segment 111. In a variant embodiment, the first and second connecting plates 1111, 1121 are connected to the first and second folding plates 1112, 1122 through screwing or welding, respectively. Alternatively, the first and second connecting plates 1111, 1121 and the first and second folding plates 1112, 1122 are integrally formed by metal injection molding.

Referring to FIG. 1 and FIG. 5, in the situation where the first segment 111 and the second segment 112 undergo the aforesaid bending-based processing process, a recess 114 is formed at the junction of the first folding plate 1112 and the second folding plate 1122, because material extrusion happens to the junction of the first folding plate 1112 and the second folding plate 1122 when the first folding plate 1112 and the second folding plate 1122 bend relative to the first connecting plate 1111 and the second connecting plate 1121. Hence, prior to the processing process, a raw metallic workpiece is cut to form a notch. At the end of the processing process, the notch spontaneously forms the recess 114 between the first folding plate 1112 and the second folding plate 1122. Therefore, the design of the recess 114 is conducive to the manufacturing process of the first connecting element 110. In a variant embodiment, the recess 114 is a gap so that the first folding plate 1112 and the second folding plate 1122 are separated rather than connected. In this embodiment, referring to FIG. 3, a third angle $\theta_3$ is formed between the first folding plate 1112 and the second folding plate 1122. The third angle $\theta_3$ is less than 180 degrees but greater than 90 degrees. Preferably, the third angle $\theta_3$ ranges from 110 degrees to 130 degrees to thereby prevent or reduce stress concentration.

In this embodiment, referring to FIG. 1 through FIG. 3, the hinge element 130 comprises a shaft 131 and an extending board 132. The extending board 132 is fixedly disposed at one end of the shaft 131. The extending board 132 is extended axially along the shaft 131. The third connecting plate 1131 of the third segment 113 and the extending board 132 are fixed to each other; hence, the first connecting element 110 and the shaft 131 rotate jointly. The third connecting plate 1131 and the extending board 132 are fixed to each other by screwing, riveting or welding, but the present invention is not limited thereto.

In this embodiment, referring to FIG. 1 through FIG. 3, the second connecting element 120 comprises a first fixing plate 121, a first boss 123, and a first extending arm 125. The first extending arm 125 has one end connected to the hinge element 130 and the other end connected to the first fixing plate 121. The first extending arm 125 is pivotally connected to the shaft 131. The first boss 123 is connected to the first fixing plate 121. The first extending arm 125 and the first boss 123 are vertically disposed on different edges of the first fixing plate 121, respectively; hence, the first boss 123 and the first extending arm 125 extend in opposite directions from different edges of the first fixing plate 121, respectively. The second connecting element 120 further comprises a second fixing plate 122, a second boss 124, and a second extending arm 126. The second extending arm 126 has one end connected to the hinge element 130 and the other end connected to the second fixing plate 122. The second extending arm 126 is pivotally connected to the shaft 131. The second boss 124 is connected to the second fixing plate 122. The second extending arm 126 and the second boss 124 are vertically disposed on different edges of the second fixing plate 122, respectively; hence, the second boss 124 and the second extending arm 126 extend in opposite directions from different edges of the second fixing plate 122, respectively.

In this embodiment, the first extending arm 125 is formed by bending one end of the first fixing plate 121, and the second extending arm 126 is formed by bending one end of the second fixing plate 122. In a variant embodiment, the first and second extending arms 125, 126 are connected to the first and second fixing plates 121, 122 by screwing or welding, respectively. Alternatively, the first and second extending arms 125, 126 and the first and second fixing plates 121, 122 are integrally formed by metal injection molding. The first extending arm 125 and the second extending arm 126 adjoin each other. The first extending arm 125 and the second extending arm 126 are fixed to each other. In this embodiment, the first extending arm 125 is connected and fixed to the second extending arm 126. For example, the first extending arm 125 and the second extending arm 126 are connected and fixed to each other with rivets. In a variant embodiment, the first extending arm 125 and the second extending arm 126 are formed integrally and connected to the first and second fixing plates 121, 122, respectively. The first extending arm 125 and the second extending arm 126 distribute stress so that the stress is further spread to the first fixing plate 121 and the second fixing plate 122. Therefore, the second connecting element 120 can bear greater stress without undergoing plastic deformation or getting damaged.

In this embodiment, referring to FIG. 3, the first fixing plate 121 and the second fixing plate 122 are coplanar. In a variant embodiment, depending on structures and component configurations in an electronic device, the first fixing plate 121 and the second fixing plate 122 are disposed on different planes, respectively. In this embodiment, referring to FIG. 1 through FIG. 3, the second connecting element 120 further comprises a bending arm 127. The bending arm 127 has one end fixed to the first extending arm 125 and the second extending arm 126 and the other end pivotally connected to the shaft 131. The bending arm 127 distributes the stress transferred by the first extending arm 125 and the second extending arm 126, and thus high stability is exhibited by the pivotal rotation of the second connecting element 120 relative to the shaft 131.

In this embodiment, referring to FIG. 1 through FIG. 3, the first boss 123 is riveted to the first fixing plate 121, whereas the second boss 124 is riveted to the second fixing plate 122. In a variant embodiment, the first and second bosses 123, 124 are connected to the first and second fixing plates 121, 122 by screwing or welding. Alternatively, the first and second bosses 123, 124 and the first and second fixing plates 121, 122 are integrally formed by metal injection molding. In this embodiment, referring to FIG. 2 and FIG. 3, the second connecting element 120 further comprises a third fixing plate 128. The third fixing plate 128 is perpendicularly connected to the first fixing plate 121. The third fixing plate 128 comprises a third fixing hole 1281. The third fixing plate 128 and the first boss 123 are disposed on the same edge of the first fixing plate 121.

In this embodiment, referring to FIG. 1 and FIG. 2, the first fixing plate 121 further comprises a rib portion 1212, and the second fixing plate 122 further comprises a through hole 1222. The rib portion 1212 has one side concave relative to the first fixing plate 121 and an opposing side convex relative to the first fixing plate 121. The rib portion 1212 is an oblong recess and is adapted to enhance the mechanical strength of the first fixing plate 121 so that the first fixing plate 121 is unlikely to bend or deform. The through hole 1222 is formed to penetrate the second fixing plate 122. The through hole 1222 is oblong. The through hole 1222 is penetrable by a wire in the electronic device to allow the wire to penetrate or go around components in the electronic device. In a variant embodiment, the first fixing plate 121 does not comprise the rib portion 1212, or the first fixing plate 121 and the second fixing plate 122 each comprise the rib portion 1212. In a variant embodiment, the second fixing plate 122 does not comprise the through hole 1222, or the first fixing plate 121 and the second fixing plate 122 each have the through hole 1222.

In this embodiment, with the hinge device 100 being made of stainless steel, the hinge device 100 has a yield strength of 319 MPa through 355 MPa. By contrast, plastics used by the prior art have a yield strength of just 55 MPa approximately. Compared with its conventional counterparts, the hinge device 100 of the present invention has a higher yield strength and thus can bear greater stress without undergoing plastic deformation or getting damaged. In a variant embodiment, the hinge device 100 further undergoes a heat treatment so that the yield strength of the hinge device 100 is greater than 355 MPa.

Figure 6:
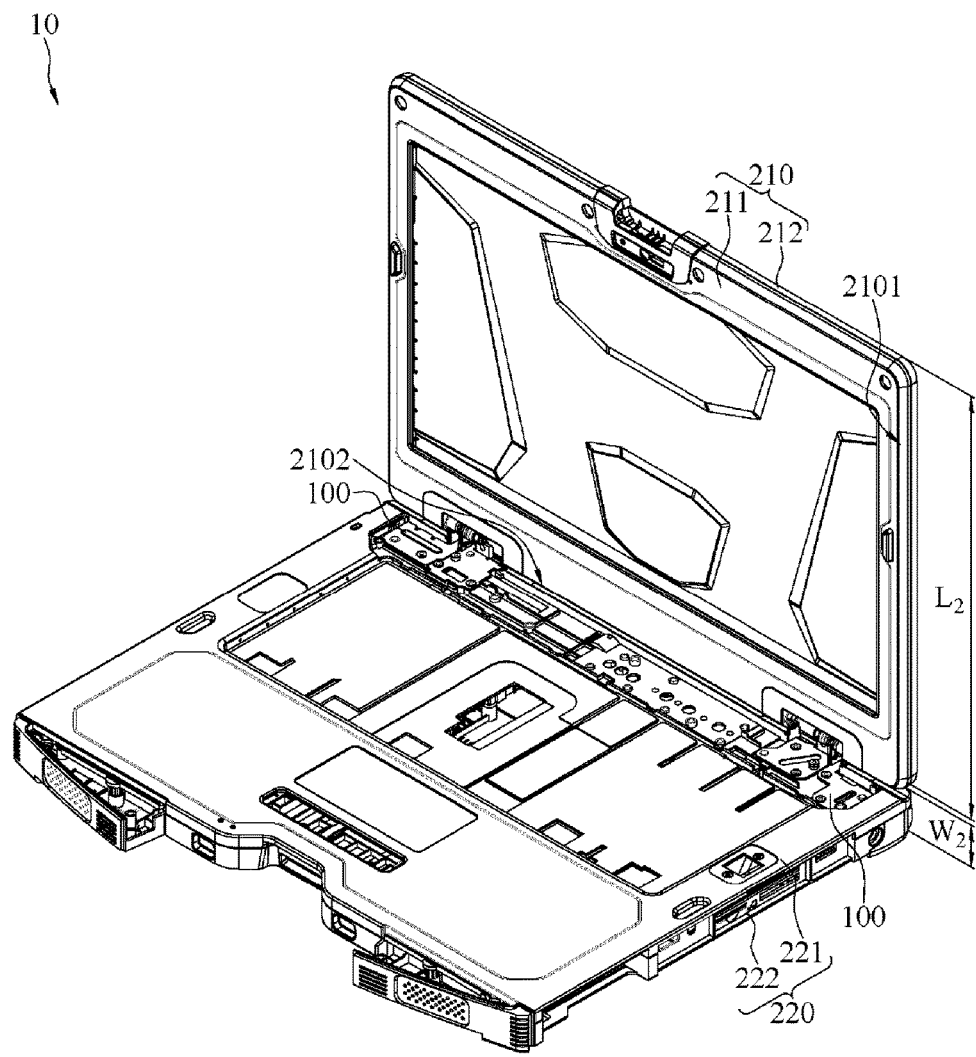
FIG. 6 is a schematic view of an electronic device according to an embodiment of the present invention.
Figure 7:
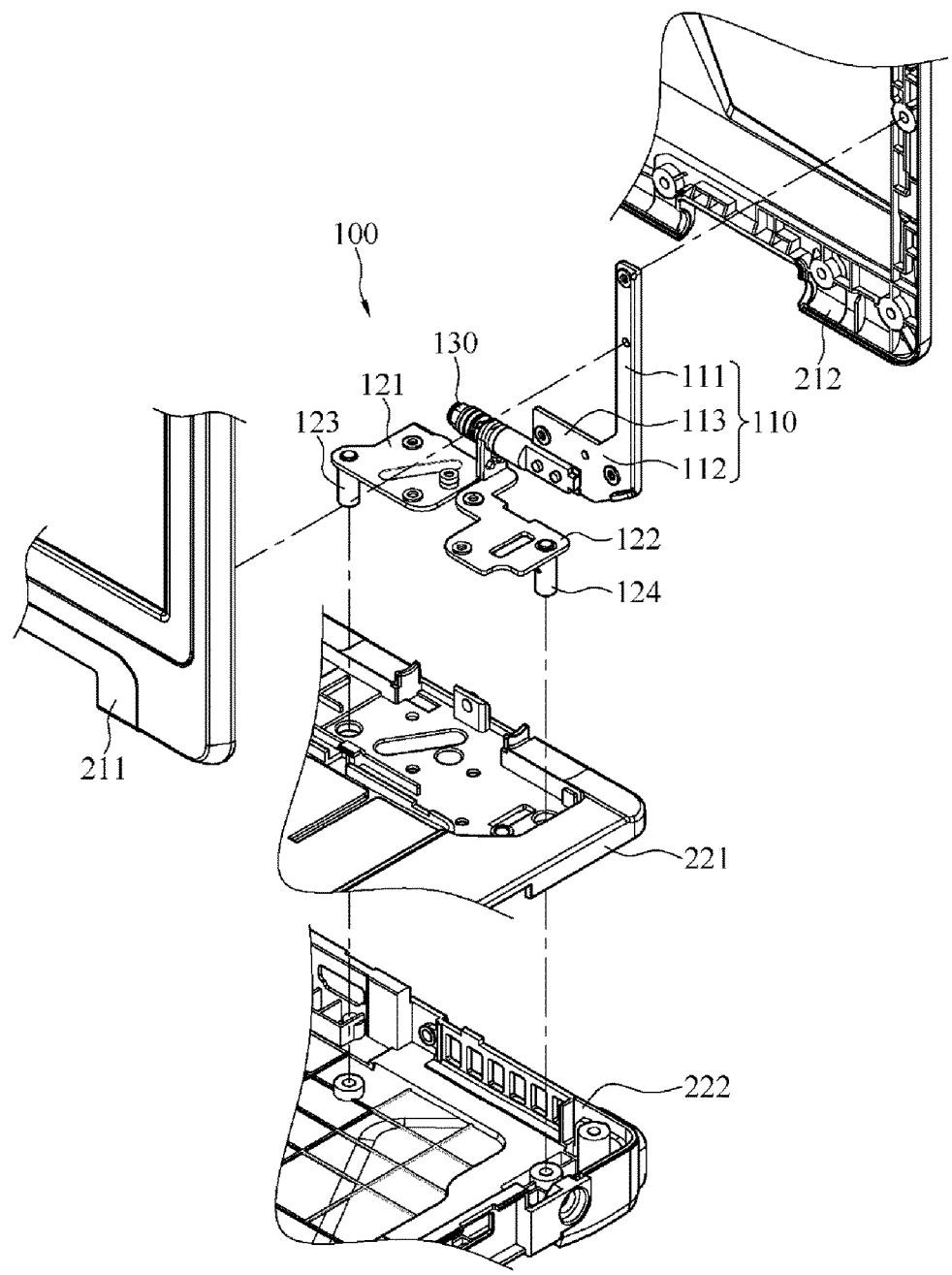
FIG. 7 is an exploded view of the electronic device.

Referring to FIG. 6 and FIG. 7, there are shown a schematic view and an exploded view of an electronic device 10 according to an embodiment of the present invention, respectively. In this embodiment, the electronic device 10 is a notebook computer, but the present invention is not limited thereto. The electronic device 10 comprises a hinge device 100, a plurality of connecting units (not shown), a first body 210, and a second body 220. The first body 210 further comprises a display module. The second body 220 further comprises a keyboard, computer parts and components, and a battery. The hinge device 100 is disposed between the first body 210 and the second body 220. The first body 210 is pivotally connected to the second body 220 through the hinge device 100. The hinge device 100 is connected to the first body 210 and the second body 220 through the connecting units, respectively. The connecting units are screws, but the present invention is not limited thereto. In this embodiment, the hinge device 100 is provided in the number of two, and the two hinge devices 100 are spaced apart from each other and symmetric to each other.

In this embodiment, referring to FIG. 1 through FIG. 5, the first connecting plate 1111 of the first connecting element 110 of the hinge device 100 comprises first connecting holes 1113, whereas the second connecting plate 1121 of the first connecting element 110 of the hinge device 100 comprises a second connecting hole 1123. The third connecting plate 1131 comprises a third connecting hole 1132. The first connecting holes 1113 and the third connecting hole 1132 are each in the number of two, whereas the second connecting hole 1123 is in the number of one, but the present invention is not limited thereto. In a variant embodiment, one or two of the first connecting plate 1111, the second connecting plate 1121, and the third connecting plate 1131 do not have any connecting hole. In this embodiment, the first fixing plate 121 of the second connecting element 120 of the hinge device 100 comprises a first fixing hole 1211. The first boss 123 comprises a first fastening hole 1231. The second fixing plate 122 comprises a second fixing hole 1221. The second boss 124 comprises a second fastening hole 1241. The first fixing hole 1211 and the second fixing hole 1221 are each in the plurality, but the present invention is not limited thereto. Referring to FIG. 2, the first fastening hole 1231 is concavely disposed on the first boss 123 and positioned distal to one end of the first fixing plate 121, and the second fastening hole 1241 is concavely disposed on the second boss 124 and positioned distal to one end of the second fixing plate 122.

In this embodiment, referring to FIG. 6 and FIG. 7, the first body 210 comprises a first board 211 and a second board 212. The first board 211 and the second board 212 cover each other. The second body 220 comprises a third board 221 and a fourth board 222. The third board 221 and the fourth board 222 cover each other.

Referring to FIG. 7, the first connecting element 110 is pivotally disposed between the first board 211 and the second board 212. One of the connecting units penetrates one of the first connecting holes 1113 and is connected to the first board 211, whereas one of the connecting units penetrates the other first connecting hole 1113 and is connected to the second board 212. The first segment 111 of the first connecting element 110 is fastened to the first board 211 and the second board 212 with screws. One of the connecting units penetrates the second connecting hole 1123 and is connected to the second board 212. One of the connecting units penetrates one said third connecting hole 1132 and is connected to the first board 211. One of the connecting units penetrates another said third connecting hole 1132 and is connected to the second board 212. The second segment 112 of the first connecting element 110 is fastened to the second board 212 with a screw, whereas the third segment 113 of the first connecting element 110 is fastened to the first board 211 and the second board 212 with screws. In a variant embodiment, the first segment 111, the second segment 112, and the third segment 113 of the first connecting element 110 are each fastened to the first board 211 or the second board 212 according to the structure of the electronic device 10 or out of any other considerations.

In this embodiment, referring to FIG. 6 and FIG. 7, the third board 221 has one side connected to the fourth board 222 and an opposing side connected to the first fixing plate 121 and the second fixing plate 122. Hence, the first fixing plate 121 and the second fixing plate 122 are not disposed between the third board 221 and the fourth board 222, but are disposed on one side of the third board 221 and positioned distal to the fourth board 222. The first boss 123 of the first fixing plate 121 and the second boss 124 of the second fixing plate 122 penetrate the third board 221 and are disposed between the third board 221 and the fourth board 222. The connecting units penetrate the first fixing hole 1211 and the second fixing hole 1221 shown in FIG. 1 and are connected to the third board 221. Therefore, the first fixing plate 121 and the second fixing plate 122 are fastened to the third board 221 with screws. In addition, the connecting units are penetratingly disposed at the first fastening hole 1231 and the second fastening hole 1241 shown in FIG. 2 and are connected to the fourth board 222. Therefore, screws penetrate through holes (not shown) of the fourth board 222 to engage with the first fastening hole 1231 and the second fastening hole 1241, respectively, so that the first boss 123 and the second boss 124 are fastened to the fourth board 222. In this embodiment, the third fixing plate 128 shown in FIG. 2 and FIG. 3 penetrates the third board 221 and is disposed between the third board 221 and the fourth board 222, whereas a screw penetrates the third fixing hole 1281 and is fastened to the fourth board 222.

Not only are the first boss 123 and the second boss 124 disposed between the third board 221 and the fourth board 222, but the first boss 123 and the second boss 124 also contribute to an increase in the overall thickness of the second connecting element 120; hence, both the first boss 123 and the second boss 124 augment the connection relationship between the second connecting element 120 and the second body 220 and reinforce their structure. Referring to FIG. 3 and FIG. 6, the first boss 123 and the second boss 124 each have a first thickness $W_1$, whereas the second body 220 has a second thickness $W_2$. In this embodiment, the first thickness $W_1$ is greater than one-third of the second thickness $W_2$. Preferably, the first thickness $W_1$ is greater than a half of the second thickness $W_2$. Therefore, the overall thickness of the second connecting element 120 is greater than one-third of that of the second body 220. Therefore, the second connecting element 120 bears a stress not just through the relatively thin first and second fixing plates 121, 122 but also through the first and second bosses 123, 124. Furthermore, with the first and second bosses 123, 124 being thick, the first and second fastening holes 1231, 1241 shown in FIG. 2 can be deeper and thus come with a longer inner thread so that screws whereby the fourth board 222 is connected to the first and second bosses 123, 124 can be of a larger length and thus come with a longer outer thread, thereby enhancing the connection relationship between the screws and the first and second fastening holes 1231, 1241. Therefore, not only is the connection between the second body 220 and the second connecting element 120 firmer, but the junction of the second body 220 and the second connecting element 120 (such as the junction of the fourth board 222 and the first and second bosses 123, 124, as effectuated by screws) is also less likely to sever or break. In addition, referring to FIG. 2 and FIG. 3, the third fixing plate 128 and the fourth board 222 are connected to each other to thereby enhance the connection between the hinge device 100 and the second body 220.

In this embodiment, referring to FIG. 6, the first body 210 is defined with a first edge 2101 and a second edge 2102 which are perpendicular to each other. The first edge 2101 is perpendicular to the axial direction of the shaft 131 of the hinge device 100. The second edge 2102 is parallel to the axial direction of the shaft 131. Referring to FIG. 3, FIG. 6 and FIG. 7, the first segment 111 of the first connecting element 110 of the hinge device 100 is parallel to the first edge 2101. The first segment 111 extends from the second segment 112 in a direction perpendicular to the axial direction of the shaft 131. The first segment 111 extends in a direction parallel to the first edge 2101. The first segment 111 is of a first length $L_1$ along the direction it extends. The first edge 2101 is of a second length $L_2$. The first length $L_1$ equals one-third to one-fourth of the second length $L_2$. The first connecting element 110 in its entirety is of a third length $L_3$ parallel to the first edge 2101. Preferably, the third length $L_3$ equals one-third of the second length $L_2$. Given the aforesaid structures, the first segment 111, the second segment 112 and third segment 113 of the first connecting element 110 of the hinge device 100 together enhance the mechanical strength of the first connecting element 110 and the first body 210. In the situation where the first body 210 comes with a large-sized screen (such as a 15-inch screen or a larger one), the second length $L_2$ of the first edge 2101 is longer, and thus a user moving the first body 210 subjects the first body 210 to a larger bending moment. The first connecting element 110 is not only conducive to an increase in a torque bearable by the hinge device 100 but also enables the first body 210 to bear a larger bending moment without bending or deforming. Therefore, the electronic device 10 can operate in harsh usage environments and conditions without getting damaged.

Although the present invention is disclosed above by preferred embodiments, the preferred embodiments are not restrictive of the present invention. Any persons skilled in the art can make some changes and modifications to the preferred embodiments without departing from the spirit of the present invention. Accordingly, the legal protection for the present invention should be defined by the appended claims.

What is claimed is:
1. A hinge device, comprising:
  a hinge element;
  a first connecting element including a first segment, a second segment and a third segment, with the second segment disposed between the first segment and the third segment to allow the first segment, the second segment and the third segment to form the first connecting element together, with the third segment con- nected to the hinge element, the first segment including a first connecting plate and a first folding plate, the first folding plate having a side connected to the first connecting plate, and a first angle, less than 180 degrees but greater than 0 degree, formed between the first connecting plate and the first folding plate; and a second connecting element including a first fixing plate, a first boss, and a first extending arm, with the first extending arm having an end connected to the hinge element and another end connected to the first fixing plate, and the first boss connected to the first fixing plate;

wherein the second segment comprises a second connecting plate and a second folding plate, with the second connecting plate having an end connected to the first connecting plate and another end connected to the third segment, the second folding plate having a side connected to the second connecting plate, and a second angle, less than 180 degrees but greater than 0 degree, formed between the second connecting plate and the second folding plate; and wherein a third angle, less than 180 degrees but greater than 90 degrees, is formed between the first folding plate and the second folding plate.

2. The hinge device of claim 1, wherein both of the first angle and the second angle are equal to 90 degrees.

3. The hinge device of claim 1, wherein the first folding plate is connected to the second folding plate and a recess is formed at a junction of the first folding plate and the second folding plate.

4. The hinge device of claim 1, wherein the hinge element comprises a shaft and an extending board, with the extending board connected to an end of the shaft and extended axially along the shaft, wherein the third segment and the extending board are fixed to each other, with the first extending arm pivotally connected to the shaft.

5. The hinge device of claim 1, wherein the second connecting element further comprises a third fixing plate perpendicularly connected to the first fixing plate.

6. A hinge device, comprising:
a hinge element;
a first connecting element including a first segment, a second segment and a third segment, with the second segment disposed between the first segment and the third segment to allow the first segment, the second segment and the third segment to form the first connecting element together, with the third segment connected to the hinge element, the first segment including a first connecting plate and a first folding plate, the first folding plate having a side connected to the first connecting plate, and a first angle, less than 180 degrees but greater than 0 degree, formed between the first connecting plate and the first folding plate; and
a second connecting element including a first fixing plate, a first boss, and a first extending arm, with the first extending arm having an end connected to the hinge element and another end connected to the first fixing plate, and the first boss connected to the first fixing plate;
wherein the second connecting element further comprises a second fixing plate, a second boss and a second extending arm, with the second extending arm having an end connected to the hinge element and another end connected to the second fixing plate, and the second boss connected to the second fixing plate.

7. The hinge device of claim 6, wherein the first extending arm and the first boss are vertically disposed on different edges of the first fixing plate, respectively, whereas the second extending arm and the second boss are vertically disposed on different edges of the second fixing plate, respectively.

8. The hinge device of claim 6, wherein the first extending arm is connected and fixed to the second extending arm.

9. The hinge device of claim 6, wherein the first extending arm and the second extending arm are integrally formed.

10. An electronic device, comprising:
the hinge device of claim 1, a hinge device, comprising:
a hinge element;
a first connecting element including a first segment, a second segment and a third segment, with the second segment disposed between the first segment and the third segment to allow the first segment, the second segment and the third segment to form the first connecting element together, with the third segment connected to the hinge element, the first segment including a first connecting plate and a first folding plate, the first folding plate having a side connected to the first connecting plate, and a first angle, less than 180 degrees but greater than 0 degree, formed between the first connecting plate and the first folding plate; and
a second connecting element including a first fixing plate, a first boss, and a first extending arm, with the first extending arm having an end connected to the hinge element and another end connected to the first fixing plate, and the first boss connected to the first fixing plate, wherein the first connecting plate comprises a plurality of first connecting holes, with the first fixing plate having a first fixing hole, the first boss having a first fastening hole, the first fastening hole concavely disposed at an end of the first boss and positioned distal to the first fixing plate;
a plurality of connecting units;
a first body including a first board and a second board, wherein one of the connecting units penetrates one of the first connecting holes and is connected to the first board, and one of the connecting units penetrates one of the first connecting holes and is connected to the second board; and
a second body including a third board and a fourth board, wherein one of the connecting units penetrates the first fixing hole and is connected to the third board, and one of the connecting units penetrates the first fastening hole and is connected to the fourth board.

11. The electronic device of claim 10, wherein the first board and the second board are connected to each other, with the first connecting element disposed between the first board and the second board, the third board having a side connected to the fourth board and the third board having an opposing side connected to the first fixing plate, and the first boss penetrating the third board and disposed between the third board and the fourth board.

12. The electronic device of claim 11, wherein the second connecting element further comprises a second fixing plate, a second boss, and a second extending arm, with the second extending arm having an end connected to the hinge element and another end connected to the second fixing plate, and the second boss connected to the second fixing plate.

13. The electronic device of claim 12, wherein the first extending arm and the first boss are vertically disposed on different edges of the first fixing plate, respectively, whereas the second extending arm and the second boss are vertically disposed on different edges of the second fixing plate, respectively.

14. The electronic device of claim 12, wherein the first extending arm is connected and fixed to the second extending arm.

15. The electronic device of claim 12, wherein the first extending arm and the second extending arm are integrally formed.

16. The electronic device of claim 12, wherein the second connecting element further comprises a third fixing plate perpendicularly connected to the first fixing plate.

17. The electronic device of claim 10, wherein a first edge and a second edge of the first body are perpendicular to each other, with the first edge being parallel to the first segment, and the second edge being parallel to the shaft, wherein a length of the first segment equals one-third to one-fourth of a length of the first edge.

18. The electronic device of claim 10, wherein the second segment comprises a second connecting plate and a second folding plate, with the second connecting plate having an end connected to the first connecting plate and another end connected to the third segment, the second folding plate having a side connected to the second connecting plate, and a second angle, less than 180 degrees but greater than 0 degree, formed between the second connecting plate and the second folding plate.

19. An electronic device, comprising:
the hinge device of claim 6, wherein the first connecting plate comprises a plurality of first connecting holes, with the first fixing plate having a first fixing hole, the first boss having a first fastening hole, the first fastening hole concavely disposed at an end of the first boss and positioned distal to the first fixing plate;
a plurality of connecting units;
a first body including a first board and a second board, wherein one of the connecting units penetrates one of the first connecting holes and is connected to the first board, and one of the connecting units penetrates one of the first connecting holes and is connected to the second board; and
a second body including a third board and a fourth board, wherein one of the connecting units penetrates the first fixing hole and is connected to the third board, and one of the connecting units penetrates the first fastening hole and is connected to the fourth board.

20. An electronic device, comprising:
the hinge device of claim 4, wherein the first connecting plate comprises a plurality of first connecting holes, with the first fixing plate having a first fixing hole, the first boss having a first fastening hole, the first fastening hole concavely disposed at an end of the first boss and positioned distal to the first fixing plate;
a plurality of connecting units;
a first body including a first board and a second board, wherein one of the connecting units penetrates one of the first connecting holes and is connected to the first board, and one of the connecting units penetrates one of the first connecting holes and is connected to the second board; and
a second body including a third board and a fourth board, wherein one of the connecting units penetrates the first fixing hole and is connected to the third board, and one of the connecting units penetrates the first fastening hole and is connected to the fourth board.

* * * * *